(12) United States Patent
Engfehr et al.

(10) Patent No.: US 10,760,506 B2
(45) Date of Patent: Sep. 1, 2020

(54) LIQUIFIED GASEOUS FUEL STORAGE TANK LEVEL CALIBRATION CONTROL SYSTEM

(71) Applicant: Caterpillar Inc., Deerfield, IL (US)

(72) Inventors: Matthew J. Engfehr, Dunlap, IL (US); Asha L. Pai, Peoria, IL (US); Roderick S. Zehrung, Marana, AZ (US); Derek P. Samsel, Tucson, AZ (US); Brett M. Nee, Germantown Hills, IL (US); Joshua Perko, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 16 days.

(21) Appl. No.: 16/269,358

(22) Filed: Feb. 6, 2019

(65) Prior Publication Data
US 2020/0248638 A1    Aug. 6, 2020

(51) Int. Cl.
| | | |
|---|---|---|
| *F02D 41/00* | (2006.01) | |
| *G01F 13/00* | (2006.01) | |
| *G01F 23/18* | (2006.01) | |
| *G01F 25/00* | (2006.01) | |
| *F02D 19/06* | (2006.01) | |
| *F02D 19/10* | (2006.01) | |
| *F02D 41/38* | (2006.01) | |
| *G01L 13/00* | (2006.01) | |
| *F02D 41/22* | (2006.01) | |

(52) U.S. Cl.
CPC ..... *F02D 19/0628* (2013.01); *F02D 19/0647* (2013.01); *F02D 19/105* (2013.01); *F02D 41/0027* (2013.01); *F02D 41/22* (2013.01); *F02D 41/3836* (2013.01); *G01F 23/18* (2013.01); *G01F 25/0061* (2013.01); *G01L 13/00* (2013.01); *F02D 2041/224* (2013.01); *F02D 2200/0602* (2013.01); *G01F 13/00* (2013.01)

(58) Field of Classification Search
CPC ............ F02D 19/0628; F02D 19/0647; F02D 19/105; F02D 41/0027; F02D 41/22; F02D 41/3836; F02D 2041/224; G01F 23/18; G01F 25/0061; G01F 13/00
See application file for complete search history.

(56) References Cited

U.S. PATENT DOCUMENTS

| | | |
|---|---|---|
| 5,379,637 A | 1/1995 | Abowd et al. |
| 9,657,653 B2 | 5/2017 | Ensan et al. |

(Continued)

*Primary Examiner* — Jacob M Amick
(74) *Attorney, Agent, or Firm* — Bookoff McAndrews

(57) ABSTRACT

A gaseous fuel supply system for an internal combustion engine may include a storage tank for storing liquefied gaseous fuel and supplying the fuel to the engine. The system may also include a liquid level sensor for measuring a level value of the liquefied gaseous fuel in the storage tank and a pressure sensor for measuring a pressure value of gaseous fuel in the fuel supply system. The system may further include a controller. The controller may be configured to: monitor a pressure signal of the pressure sensor indicating the pressure value and a tank level signal of the liquid level sensor indicating the level value; store the level value when the pressure value indicates the storage tank is empty; store the level value when the pressure value or the level value indicates the storage tank is full; and determine a calibrated level range based on the stored level values.

20 Claims, 4 Drawing Sheets

(56) References Cited

U.S. PATENT DOCUMENTS

| | | | |
|---|---|---|---|
| 2014/0223992 A1* | 8/2014 | Harper | G01F 23/26 73/23.31 |
| 2016/0201854 A1* | 7/2016 | Weickert | F17C 11/007 73/73 |
| 2020/0079330 A1* | 3/2020 | Dudar | B60S 5/02 |

* cited by examiner

LIQUIFIED GASEOUS FUEL STORAGE TANK LEVEL CALIBRATION CONTROL SYSTEM

TECHNICAL FIELD

The present disclosure relates generally to fuel supply systems for internal combustion engines, and more particularly, to a liquefied gaseous fuel storage tank calibration control system for such fuel supply systems.

BACKGROUND

Fuel supply systems of internal combustion engines for stationary or mobile machinery may utilize liquid or gaseous fuel. For example, diesel fuel may be used in a diesel engine to provide a desired torque and combustion efficiency. Gaseous fuel, such as natural gas, may be used in a gaseous fuel engine to provide adequate torque, while potentially achieving reduced cost due to a ready supply of natural gas at certain engine locations. Some internal combustion engines, known as dual-fuel engines, are configured to run on two different fuels. For example, some internal combustion engines can employ diesel fuel as a pilot fuel and natural gas as a primary fuel. When natural gas is used as a fuel, the natural gas may be stored in liquid form as liquid natural gas (LNG) in a pressurized storage tank. The level of LNG stored in the storage tank may be measured by a liquid level sensor, such as a capacitance level sensor. Further, the LNG is supplied to the engine as natural gas by maintaining a pressure in the storage tank and the fuel supply system above a minimum threshold. As the fuel in the storage tank is consumed by the engine, the level of LNG in the storage tank decreases. Eventually, the level of LNG will decrease below a threshold level such that the pressure in the fuel supply system will decrease below the minimum threshold for supplying natural gas to the engine. However, there may be residual LNG available in the storage tank even though there is not enough pressure to supply the natural gas remaining in the storage tank to the engine.

One problem with current storage tank systems is that the storage tank level and pressure inside the storage tank may not be well correlated during operation in mobile machinery applications. For example, the pressure in the storage tank depends on many factors, including saturated LNG temperature, liquid-vapor volume and mass ratio, LNG boil off rate due to heat transfer, sloshing of the fuel in the storage tank causing collapse of vapor pressure, and engine fuel consumption rate. Further, in systems that utilize a liquid level sensor, the operator may see the tank level indicator in the cab display a perceived usable tank level because of the residual LNG in the storage tank. However, the engine is not able to utilize the residual LNG in the storage tank due to the pressure being too low to supply natural gas to the engine. As such, the storage tank may be effectively empty while the tank level indicator indicates that there is LNG remaining in the storage tank. Various factors may also affect the accuracy of the tank level indicator. For example, capacitance of the liquid level sensor may change over time or the operator may use different types of gaseous fuels that have different dielectric constants.

U.S. Pat. No. 5,379,637, issued to Abowd on Jan. 10, 1995 ("the '637 patent"), describes a system and method of measuring and indicating a level of natural gas fuel in a storage tank of a motor vehicle. The system utilizes a pressure sensor for measuring pressure inside the tank and a temperature sensor for measuring temperature of the natural gas inside the tank. A control unit determines a command for a gauge indicative of the amount of fuel in the tank in response to the measured pressure and temperature. The '637 patent further discloses the control unit uses a look-up table to retrieve a signal representative of a percentage that the tank is full of the natural gas based on the measured pressure and temperature. As such, the system and method of the '637 patent indicates a level of natural gas fuel in the storage tank. However, the '637 patent does not disclose that the control unit indicates the tank as empty when there is residual LNG remaining in the tank that is not useable.

The systems and methods of the present disclosure may address or solve one or more of the problems set forth above and/or other problems in the art. The scope of the current disclosure, however, is defined by the attached claims, and not by the ability to solve any specific problem.

SUMMARY

In one aspect, a gaseous fuel supply system for an internal combustion engine may include a storage tank for storing liquefied gaseous fuel and supplying the fuel to the engine. The system may also include a liquid level sensor for measuring a level value of the liquefied gaseous fuel in the storage tank and a pressure sensor for measuring a pressure value of gaseous fuel in the fuel supply system. The system may further include a controller configured to: monitor a pressure signal of the pressure sensor indicating the pressure value and a tank level signal of the liquid level sensor indicating the level value; store the level value when the pressure value indicates the storage tank is empty; store the level value when the pressure value or the level value indicates the storage tank is full; and determine a calibrated level range based on the stored level values.

In another aspect, a method for calibrating a liquefied gaseous fuel storage tank level may include monitoring a pressure signal from a pressure sensor and a tank level signal from a liquid level sensor, the pressure signal indicating a pressure value of gaseous fuel in a fuel supply system for an internal combustion engine and the tank level signal indicating a level value of liquefied gaseous fuel in the storage tank. The method may also include storing the level value when the pressure value indicates the storage tank is empty and storing the level value when the pressure value or the level value indicates the storage tank is full. The method may further include determining a calibrated level range based on the stored values.

In yet another aspect, a gaseous fuel supply system for an internal combustion engine may include a storage tank for storing liquefied gaseous fuel and supplying gaseous fuel to the engine. The system may also include a liquid level sensor for measuring a level value of the liquefied gaseous fuel in the storage tank and a pressure sensor for measuring a pressure value of the gaseous fuel in the fuel supply system. The system may further include a controller configured to: monitor a pressure signal of the pressure sensor indicating the pressure value and a tank level signal of the liquid level sensor indicating the level value; output the tank level signal to a level indicator based on a current tank level signal and a calibrated level range, wherein the calibrated level range is based on stored level values when the pressure signal indicates the storage tank is empty or full.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±10% in a stated value.

Figure 1:
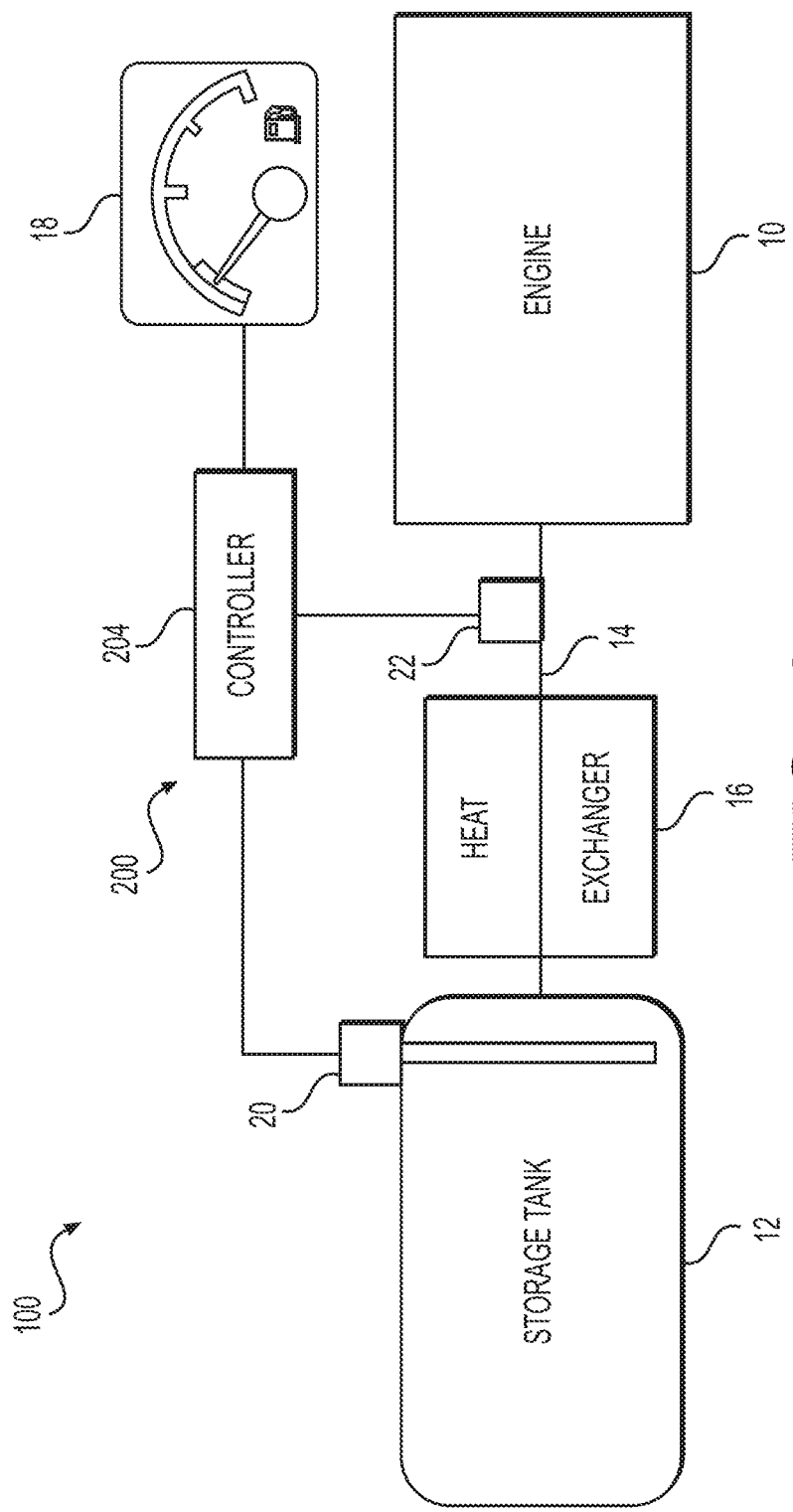
FIG. 1 illustrates a schematic view of a fuel supply system for an internal combustion engine with an exemplary liquefied gaseous fuel storage tank level calibration control system, according to aspects of the disclosure.

FIG. 1 illustrates a schematic view of a fuel supply system 100 for an internal combustion engine 10 with an exemplary liquefied gaseous fuel tank level calibration control system 200, according to aspects of the disclosure. Engine 10 may be, for example, a dual-fuel engine used in mining or construction vehicles. As such, engine 10 may employ liquid fuel and/or gaseous fuel, or a combination of both liquid fuel and gaseous fuel. As used herein, "liquid fuel" may include fuel that is supplied to engine 10 in liquid form. Liquid fuel may include, for example, gasoline, diesel, methanol, ethanol, or any other type of liquid fuel. Further, as used herein, "gaseous fuel" may include fuel that is supplied to engine 10 in gaseous form. Gaseous fuel may be liquefied and stored in liquid form in a storage tank. Gaseous fuel may include, for example, natural gas, propane, bio-gas, landfill gas, carbon monoxide, hydrogen, or mixtures thereof. In an exemplary embodiment, the liquid fuel may be diesel fuel and the gaseous fuel may be natural gas. Natural gas is an exemplary gaseous fuel having various levels of purity. As used herein "natural gas" refers to both pure and relatively impure forms having various amounts of methane and other constituents. It is understood that engine 10 may employ a single fuel at one time or may employ both the liquid fuel and the gaseous fuel in unison and that the liquid fuel and the gaseous fuel may be any type of liquid fuel or gaseous fuel, respectively. Further, while the exemplary embodiment of the present disclosure is made with reference to a fuel supply system 100 for an engine 10 used in mining or construction vehicles, it is understood that the teachings of this disclosure may be employed on other types of vehicles or in standalone engines used in various power generation applications.

Fuel supply system 100 may include a storage tank 12 for storing the gaseous fuel in a liquid form. For example, the natural gas may be liquefied as liquid natural gas (LNG) and the storage tank 12 may be a pressurized cryogenic tank for storing LNG. A gas line 14 may be coupled to engine 10 and storage tank 12 for providing the natural gas from storage tank 12 to engine 10. Accordingly, fuel supply system 100 may rely on a pressure differential between the engine 10 and a pressure inside storage tank 12 to induce a flow of natural gas out of the storage tank 12 to the engine 10. Further, a heat exchanger 14 may heat the LNG to convert the LNG to gas in the gas line 14 prior to introduction to an intake component of engine 10. Thus, the natural gas may be provided to the intake component of engine 10 in a compressed form as compressed natural gas (CNG). It is understood that storage tank 12 may be any type of storage tank for storing any type of liquefied gaseous fuel.

Fuel supply system 100 may also include a tank level indicator 18, for indicating a level of liquefied gaseous fuel (e.g., LNG) in the storage tank 12. In an exemplary embodiment, tank level indicator 18 may include a fuel gauge having indicator markers, such as empty and full indicator markers, and a needle, or the like, for pointing to the indicator markers for indicating the level of liquefied gaseous fuel in the storage tank 12. For example, when the level of liquefied gaseous fuel in storage tank 12 decreases to an empty condition, tank level indicator 18 may point the needle to the empty indicator marker. In other embodiments, tank level indicator 18 may include a binary mechanism, such as a light, for indicating an empty condition and/or a full condition of storage tank 12. For example, when the level of liquefied gaseous fuel in storage tank 12 decreases to an empty condition, tank level indicator 18 may activate a light indicating storage tank 12 is empty. In one embodiment, the empty condition may include a level of liquefied gaseous fuel in storage tank 12 that is greater than zero (0). For example, the empty condition may correspond to the level of liquefied gaseous fuel remaining in storage tank 12 when a pressure of fuel (e.g., natural gas) in the fuel supply system 100 decreases below a minimum threshold value for maintaining the flow of fuel to engine 10. It is understood that tank level indicator 18 may be any type of level indicator for indicating a level of any type of liquefied gaseous fuel in a storage tank.

As further shown in FIG. 1, fuel supply system 100 may include a liquid level sensor 20 and a pressure sensor 22. Liquid level sensor 20 may be coupled to storage tank 12 for measuring a level of liquefied gaseous fuel in storage tank 12. Liquid level sensor 20 may be any type of sensor or device for measuring a level of a liquid including, for example, capacitive sensors, resistance sensors, magnetic reed switch-based floats, electro-optical sensors, conductivity sensors, differential pressure sensors, ultrasonic sensors, or piezoelectric sensors. Pressure sensor 22 may measure a pressure of the fuel (e.g., natural gas) in the fuel supply system 100. For example, pressure sensor 22 may be located adjacent the intake component of engine 10 for measuring a pressure of the natural gas entering engine 10. However, pressure sensor 22 may be located anywhere along gas line 14, in engine 10, or in storage tank 12. Pressure sensor 22 may be any appropriate type of sensor known in the art for measuring gas pressure.

Liquid level sensor 20 and pressure sensor 22 may be in communication with a controller 204, such as an electronic control module (ECM). Controller 204 may receive inputs from liquid level sensor 20 and pressure sensor 22 and control outputs of fuel supply system 100 and engine 10, as is known in the art. Controller 204 may also be in communication with tank level indicator 18 to output signals for controlling tank level indicator 18 based on the inputs received from liquid level sensor 20 and pressure sensor 22, as further detailed below with respect to FIGS. 2 and 3.

Figure 2:
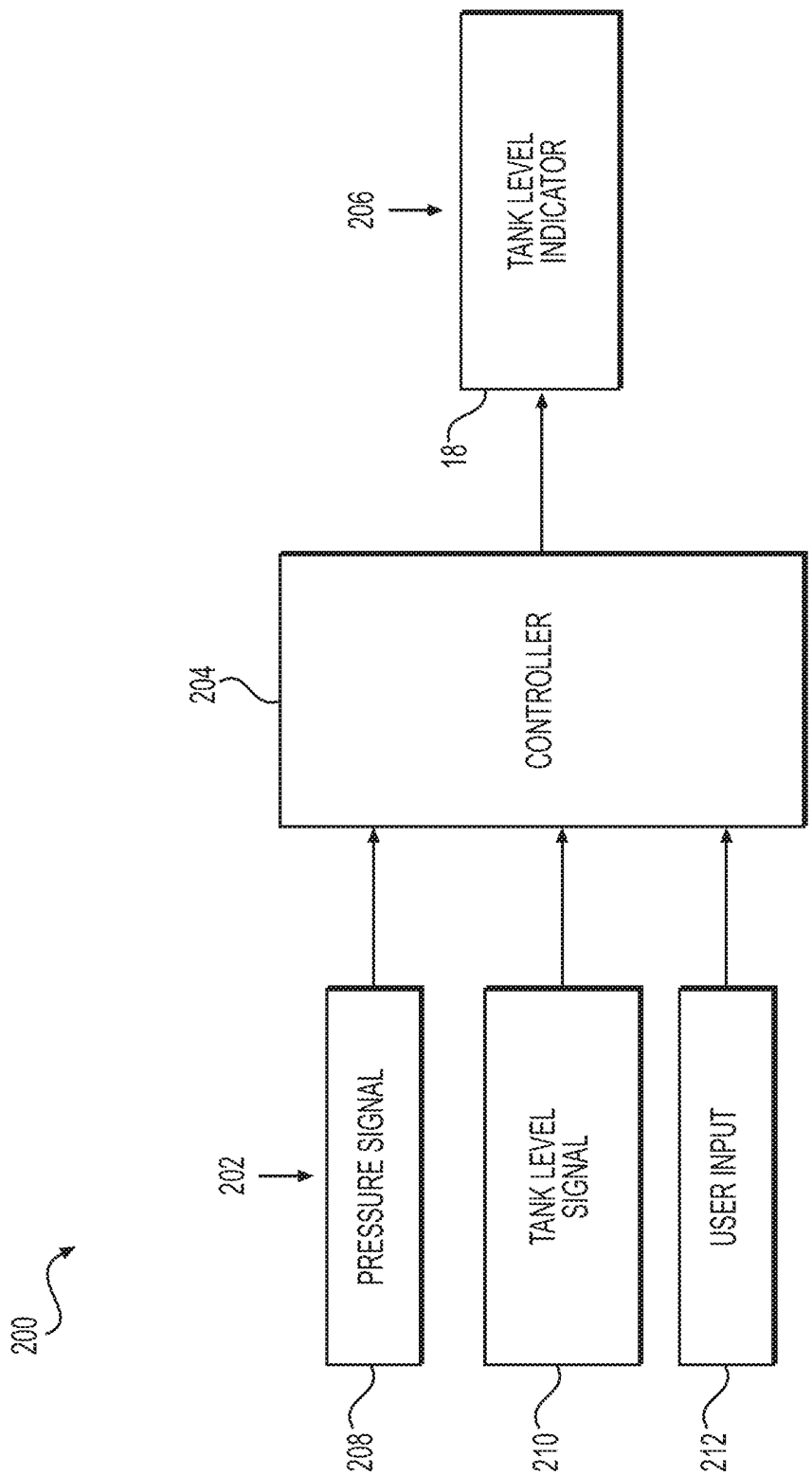
FIG. 2 illustrates a schematic view of the exemplary control system of the fuel supply system of FIG. 1.

FIG. 2 illustrates a schematic view of liquefied gaseous fuel tank level calibration control system 200 of fuel supply system 100 for operation and/or control of at least portions of fuel supply system 100. Control system 200 may include inputs 202, controller 204, and outputs 206. Inputs 202 may include, for example, signals from pressure sensor 22 and liquid level sensor 20, including a pressure signal 208 and a tank level signal 210. Inputs 202 may further include a signal for a user input 212. Outputs 206 may include, for example, a control of the tank level indicator 18.

Controller 204 may embody a single microprocessor or multiple microprocessors that may include means for calibrating tank level indicator 18 and indicating a calibrated level of liquefied gaseous fuel in storage tank 12 via the tank level indicator 18. For example, controller 204 may include a memory, a secondary storage device, a processor, such as a central processing unit or any other means for accomplishing a task consistent with the present disclosure. The memory or secondary storage device associated with controller 204 may store data and/or software routines that may assist controller 204 in performing its functions. Further, the memory or secondary storage device associated with controller 204 may also store data received from the various inputs 204 associated with fuel supply system 100. Numerous commercially available microprocessors can be configured to perform the functions of controller 204. It should be appreciated that controller 204 could readily embody a general machine controller capable of controlling numerous other machine functions. Various other known circuits may be associated with controller 204, including signal-conditioning circuitry, communication circuitry, hydraulic or other actuation circuitry, and other appropriate circuitry.

The pressure signal 208 may correspond to a pressure measured by the pressure sensor 22. The pressure sensor 22 may be configured to communicate a signal indicating the pressure in the fuel supply system 100 to controller 204. Controller 204 may also derive pressure information from other sources, including other sensors.

The tank level signal 210 may correspond to a level of liquefied gaseous fuel in the storage tank 12 measured by the liquid level sensor 20. For example, when the liquid level sensor 20 is a capacitance level sensor, controller 204 may receive signals indicating a measured capacitance of the liquefied gaseous fuel in storage tank 12. Controller 204 may then determine a level of liquefied gaseous fuel in storage tank 12 based on the measured capacitance. Controller 204 may determine the level of liquefied gaseous fuel by using a stored lookup table that maps different levels of liquefied gaseous fuel to corresponding values of capacitance. Controller 204 may also derive tank level information from other sources, including other sensors.

User input 212 may include input received from a user via an input device in communication with controller 204. Input device may be, for example, a computing device or the like. User input 212 may include input of an empty condition and a full condition of storage tank 12, as further detailed below.

INDUSTRIAL APPLICABILITY

The disclosed aspects of liquefied gaseous fuel tank level calibration control system 200 of the present disclosure may be used in any internal combustion engine that utilizes gaseous fuel as a fuel source.

Figure 3:
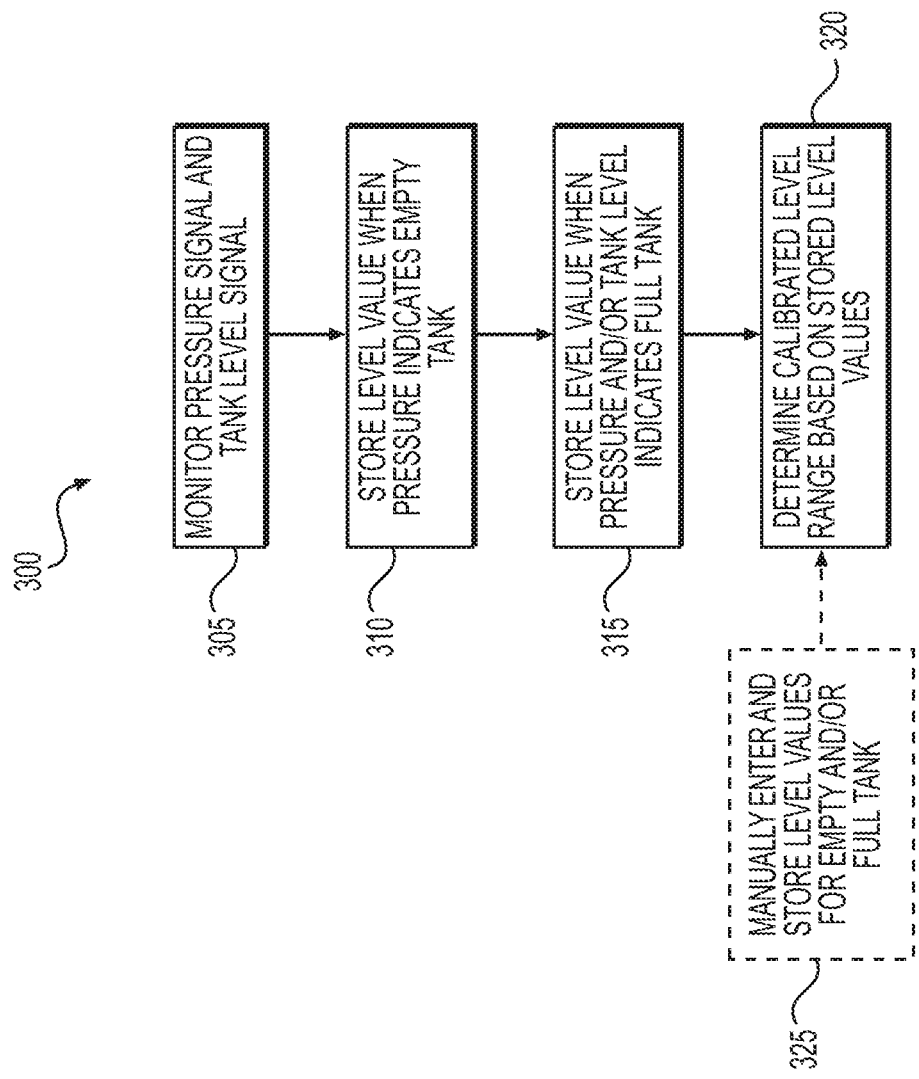
FIG. 3 provides a flowchart depicting an exemplary method for calibrating a liquefied gaseous fuel storage tank level before normal operation of the engine for the control system of FIGS. 1 and 2.

FIG. 3 illustrates a flowchart depicting an exemplary method 300 for calibrating a liquefied gaseous fuel storage tank level before normal operation of engine 10 for control system 200. In step 305, controller 204 may monitor the pressure signal 208 and the tank level signal 210. As such, controller 204 may receive signals from pressure sensor 22 indicating a pressure value for determining a pressure in the fuel supply system 100 for engine 10. For example, controller 204 may receive pressure signal 208. Further, controller 204 may receive signals from liquid level sensor 20 indicating a level value for determining the level of liquefied gaseous fuel (e.g., LNG) in storage tank 12. For example, controller 204 may receive tank level signal 210.

In step 310, controller 204 may store the level value when the pressure indicates the storage tank 12 is empty. Controller 204 may determine that the pressure indicates the storage tank 12 is empty when the pressure of gaseous fuel (e.g., natural gas) in fuel supply system 100 decreases below a minimum threshold value. In one embodiment, the minimum threshold value may be a predetermined value stored in controller 204. In another embodiment, the minimum threshold value may be determined by control system 200 during operation of engine 10 and may be based on values from one or more sensors of control system 200. For example, the minimum threshold value may be the minimum amount of pressure required to maintain a flow of gaseous fuel to engine 10. For example, a pressure of natural gas in the gas line 14 may decrease below a minimum threshold value of pressure for maintaining flow of natural gas into engine 10 even though LNG may be remaining in the storage tank 12. Therefore, storage tank 12 may be effectively empty. As such, controller 204 may determine storage tank 12 is empty even if a substantial level of liquefied gaseous fuel (e.g., LNG) remains in storage tank 12. As used herein, a "substantial level" of liquefied gaseous fuel is a value of the level of liquefied gaseous fuel in storage tank 12 that is greater than zero (0). Thus, the level value for empty may be the level of liquefied gaseous fuel in storage tank 12 when the pressure in fuel supply system 100 decreases below the minimum threshold value.

In step 315, controller 204 may store the level value when the pressure and/or level indicates the storage tank 12 is full. Controller 204 may determine that the pressure and/or level indicates the storage tank 12 is full when the pressure of gaseous fuel (e.g., natural gas) in fuel supply system 100 and/or the level of liquefied gaseous fuel in storage tank 12 increases above a predetermined threshold value. The threshold value of pressure and/or level may be a predetermined range of pressure values and/or level values for determining the storage tank 12 is full. Thus, the level value for full may be the level of liquefied gaseous fuel in storage tank 12 when the pressure in fuel supply system 100 and/or the level of liquefied gaseous fuel in storage tank 12 increases above the predetermined threshold values, respectively.

In step 320, controller 204 may determine a calibrated level range based on the stored level values for empty and full. The calibrated level range may be the range between the stored level value corresponding to the empty storage tank 12 and the stored level value corresponding to the full storage tank 12, respectively. For example, when the liquid level sensor 20 is a capacitance level sensor, the stored level value for empty may be four hundred picofarads (400 pF) and the stored level value for full may be eight hundred picofarads (800 pF). Controller 204 may determine the calibrated level range is between 400 pF and 800 pF.

In an alternative embodiment, the level values for an empty storage tank 12 and a full storage tank 12 may be manually entered. In alternative step 325, controller 204 may store the entered level values for the empty storage tank 12 and the full storage tank 12. As such, controller 204 may receive user input 212 of the level values for empty and full. For example, a user, such as a technician, may monitor the pressure signal 208 and the tank level signal 210 via controller 204. The user may access the pressure signal 208 and tank level signal 210 information by a diagnostic software, such as an electronic technician tool, that displays such information from controller 204. The diagnostic software may further allow the user to input (e.g., user input 212) the level values for empty and full into the memory of controller 204.

As described above, method 300 may be performed during an initial set-up of engine 10 before normal or full operation of engine 10. For example, method 300 may be performed during commissioning of engine 10. Thus, method 300 may be used to initially calibrate the liquefied gaseous fuel storage tank level for fuel supply system 100. After the initial calibration and during normal or full operation of engine 10, control system 200 may calibrate the liquefied gaseous fuel storage tank level using method 400.

Figure 4:
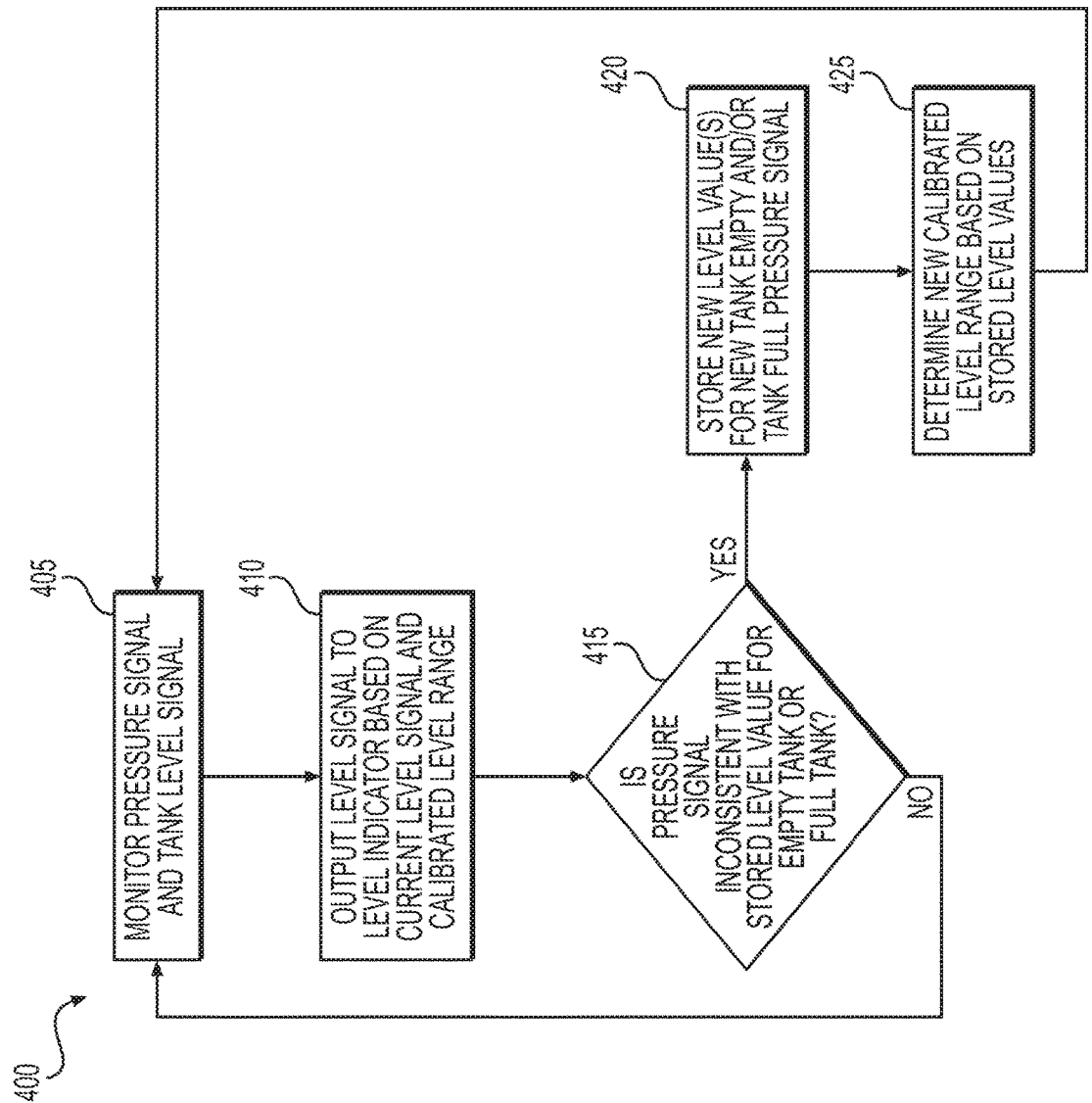
FIG. 4 provides a flowchart depicting an exemplary method for calibrating a liquefied gaseous fuel storage tank level during normal operation of the engine for the control system of FIGS. 1 and 2.

FIG. 4 illustrates a flowchart depicting an exemplary method 400 for calibrating a liquefied gaseous fuel storage tank level during normal operation of engine 10 for control system 200. In step 405, controller 204 may monitor the pressure signal 208 and the tank level signal 210. As such, controller 204 may receive signals from pressure sensor 22 indicating a pressure value for determining a pressure in the fuel supply system 100 for engine 10. For example, controller 204 may receive pressure signal 208. Further, controller 204 may receive signals from liquid level sensor 20 indicating a level value for determining a level of liquefied gaseous fuel (e.g., LNG) in storage tank 12. For example, controller 204 may receive tank level signal 210.

In step 410, controller 204 may output the tank level signal 210 to tank level indicator 18 based on the current level signal 210 and the calibrated level range. For example, when the tank level indicator 18 is a gauge-type level indicator, controller 204 may control the gauge to indicate a current level of liquefied gaseous fuel remaining in the storage tank 12 based on the calibrated level range. Controller 204 may control a needle of the gauge to indicate an amount (e.g., a percentage) that the level value of the current level signal 210 is between the stored level values for empty and full based on the calibrated level range. As such, tank level indicator 18 may indicate the level of liquefied gaseous fuel remaining in storage tank 12 as a percentage from full based on the calibrated level range. For example, if the calibrated level range is between 400 pF and 800 pF for empty and full, respectively, and the level value of the current level signal 210 is 600 pF, the tank level indicator 18 may indicate (by the needle of the gauge) that the level of liquefied gaseous fuel remaining in storage tank 12 is fifty percent (50%) from full.

In step 415, controller 204 may determine whether the pressure signal 208 is inconsistent with the stored level value for empty storage tank 12 or full storage tank 12. For example, when the pressure in fuel supply system 100 decreases below the minimum threshold value again, the level value may be different than the stored level value for empty. Likewise, when the pressure and/or level increases above the predetermined threshold value for full, the level value may be different than the stored level value for full. If the pressure signal is consistent with the stored level value for empty or full (step 415: NO), method 400 may repeat from step 405. In one embodiment, controller 204 may use a range of level values that may be considered the same or consistent. For example, if the level value is within the range when the pressure decreases below or increases above the threshold values, controller 204 may determine that pressure signal is consistent with the stored level value for empty or full, respectively.

However, if the pressure signal is inconsistent (e.g., not the same or outside the range) with the stored level value for empty or full (step 415: YES), controller 204 may store the new level value for the new empty or full pressure signal (step 420). The new level value for empty may be the level of liquefied gaseous fuel in storage tank 12 when pressure decreases below the minimum threshold value and the new level value is different than the stored level value for empty. Likewise, the new level value for full may be the level of liquefied gaseous fuel in storage tank 12 when pressure in fuel supply system 100 and/or level of liquefied gaseous fuel in storage tank 12 increase above a predetermined threshold value.

In step 425, controller 204 may determine a new calibrated level range based on the new stored level values for empty and/or full. The new calibrated level range may be the range between the stored level value or new level value corresponding to the empty storage tank 12 and the stored level value or new level value corresponding to the full storage tank 12, respectively. After controller 204 has determined the new calibrated level range, method 400 may repeat from step 405.

Such a control system 200 of the present disclosure may provide for a more accurate measurement of the level of liquefied gaseous fuel (e.g., LNG) in storage tank 12. For example, the present disclosure may indicate when the storage tank 12 is effectively empty even if there is liquefied gaseous fuel remaining in the storage tank 12. This information may be beneficial to an operator to allow the operator to determine how much useable liquefied gaseous fuel is remaining in the storage tank 12. Further, control system 200 may account for various factors that may affect accurate indication of the level of liquefied gaseous fuel in storage tank 12, such as capacitance of the liquid level sensor 20 changing over time or different types of gaseous fuels being utilized that have different dielectric constants.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A gaseous fuel supply system for an internal combustion engine, comprising:
    a storage tank for storing liquefied gaseous fuel and supplying the fuel to the engine;
    a liquid level sensor for measuring a level value of the liquefied gaseous fuel in the storage tank;
    a pressure sensor for measuring a pressure value of gaseous fuel in the fuel supply system; and
    a controller configured to:
        monitor a pressure signal of the pressure sensor indicating the pressure value and a tank level signal of the liquid level sensor indicating the level value;
        store the level value when the pressure value indicates the storage tank is empty;
        store the level value when the pressure value or the level value indicates the storage tank is full; and determine a calibrated level range based on the stored level values.

2. The system of claim 1, wherein the calibrated level range is the range between the level value for empty and the level value for full.

3. The system of claim 2, wherein the controller is further configured to:
determine the pressure value indicates the storage tank is empty when the pressure value decreases below a minimum threshold value.

4. The system of claim 3, wherein the minimum threshold value is the minimum pressure value for maintaining a flow of gaseous fuel to the engine.

5. The system of claim 4, wherein the controller is further configured to:
determine the pressure value indicates the storage tank is full when the pressure value or the level value increases above a predetermined threshold value for full.

6. The system of claim 1, wherein the controller is further configured to:
output the tank level signal to a tank level indicator based on a current tank level signal and the calibrated level range.

7. The system of claim 6, wherein the output of the tank level signal corresponds to the level value of the current tank level signal as a percentage in the calibrated level range.

8. The system of claim 7, wherein the percentage is an amount that the level value of the current tank level signal is between the stored level values for empty and full.

9. The system of claim 6, wherein the controller is further configured to:
determine if the pressure signal is inconsistent with the stored level values for empty or full;
if the pressure signal is inconsistent with the stored level values for empty or full, store a new level value for empty or full; and
determine a new calibrated level range based on the stored level values.

10. The system of claim 1, wherein the controller is further configured to:
receive an input of the level values for empty and full from a user; and
store the input level values for empty and full.

11. A method for calibrating a liquefied gaseous fuel storage tank level, the method comprising:
monitoring a pressure signal from a pressure sensor and a tank level signal from a liquid level sensor, the pressure signal indicating a pressure value of gaseous fuel in a fuel supply system for an internal combustion engine and the tank level signal indicating a level value of liquefied gaseous fuel in the storage tank;
storing the level value when the pressure value indicates the storage tank is empty;
storing the level value when the pressure value or the level value indicates the storage tank is full; and
determining a calibrated level range based on the stored values.

12. The method of claim 11, wherein the calibrated level range is the range between the level value for empty and the level value for full.

13. The method of claim 12, further comprising:
determining the pressure value indicates the storage tank is empty when the pressure value decreases below a minimum threshold value.

14. The method of claim 13, wherein the minimum threshold value is the minimum pressure value for maintaining a flow of gaseous fuel to the engine.

15. The method of claim 14, further comprising:
determining the pressure value indicates the storage tank is full when the pressure value or the level value increases above a predetermined threshold value for full.

16. The method of claim 11, further comprising:
outputting the tank level signal to a tank level indicator based on a current tank level signal and the calibrated level range.

17. The method of claim 16, wherein the output of the tank level signal corresponds to the level value of the current tank level signal as a percentage in the calibrated level range.

18. The method of claim 17, wherein the percentage is an amount that the level value of the current tank level signal is between the stored level values for empty and full.

19. The method of claim 16, further comprising:
determining if the pressure signal is inconsistent with the stored level values for empty or full;
if the pressure signal is inconsistent with the stored level values for empty or full, store a new level value for empty or full; and
determining a new calibrated level range based on the stored level values.

20. A gaseous fuel supply system for an internal combustion engine, comprising:
a storage tank for storing liquefied gaseous fuel and supplying gaseous fuel to the engine;
a liquid level sensor for measuring a level value of the liquefied gaseous fuel in the storage tank;
a pressure sensor for measuring a pressure value of the gaseous fuel in the fuel supply system; and
a controller configured to:
monitor a pressure signal of the pressure sensor indicating the pressure value and a tank level signal of the liquid level sensor indicating the level value;
output the tank level signal to a level indicator based on a current tank level signal and a calibrated level range, wherein the calibrated level range is based on stored level values when the pressure signal indicates the storage tank is empty or full.

* * * * *